US011003897B2

(12) United States Patent
You et al.

(10) Patent No.: US 11,003,897 B2
(45) Date of Patent: May 11, 2021

(54) THREE-DIMENSIONAL REAL FACE MODELING METHOD AND THREE-DIMENSIONAL REAL FACE CAMERA SYSTEM

(71) Applicants: Wisesoft Co., Ltd., Chengdu (CN); Sichuan University, Chengdu (CN)

(72) Inventors: Zhisheng You, Chengdu (CN); Hailong Jing, Chengdu (CN); Jiangping Zhu, Chengdu (CN)

(73) Assignees: Wisesoft Co., Ltd., Chengdu (CN); Sichuan University, Chengdu (CN)

( * ) Notice: Subject to any disclaimer, the term of this patent is extended or adjusted under 35 U.S.C. 154(b) by 92 days.

(21) Appl. No.: 16/512,782

(22) Filed: Jul. 16, 2019

(65) Prior Publication Data
US 2020/0293763 A1 Sep. 17, 2020

(51) Int. Cl.
| | | |
|---|---|---|
| *G06K 9/00* | (2006.01) | |
| *G06T 15/20* | (2011.01) | |
| *G06T 19/20* | (2011.01) | |
| *G06T 7/50* | (2017.01) | |
| *G06T 15/50* | (2011.01) | |

(52) U.S. Cl.
CPC ..... *G06K 9/00302* (2013.01); *G06K 9/00268* (2013.01); *G06T 7/50* (2017.01); *G06T 15/205* (2013.01); *G06T 15/50* (2013.01); *G06T 19/20* (2013.01)

(58) Field of Classification Search
CPC .. G06K 9/00302; G06K 9/00268; G06T 7/50; G06T 15/205; G06T 15/50; G06T 19/20
See application file for complete search history.

(56) References Cited

U.S. PATENT DOCUMENTS

| | | | | |
|---|---|---|---|---|
| 5,995,639 A | * | 11/1999 | Kado | ................ G06K 9/00255 382/118 |
| 6,850,872 B1 | * | 2/2005 | Marschner | ........... G06K 9/4661 703/1 |

(Continued)

*Primary Examiner* — Manav Seth
(74) *Attorney, Agent, or Firm* — Andrew D. Fortney; Central California IP Group, P.C.

(57) ABSTRACT

The present invention relates to the field of three-dimensional face modeling, and provides a three-dimensional real face modeling method and a three-dimensional real face camera system. The three-dimensional real face modeling method includes the following steps: 1, projecting structured light to a target face, and taking a photo to acquire facial three-dimensional geometric data; 2, acquiring facial skin chroma data and brightness data; 3, triangulating the facial three-dimensional geometric data; 4, acquiring patch chroma data corresponding to each of triangular patch regions; 5, performing interpolation calculation to acquire patch brightness data corresponding to each of the triangular patch regions; and 6, calculating a reflectivity of a facial skin region corresponding to each of pixel points. The three-dimensional real face camera system includes: a standard light source, a control and calculation module and a three-dimensional portrait acquisition unit. By the adoption of the three-dimensional real face modeling method and system, three-dimensional real face information unrelated to a modeling device for three-dimensional modeling and an illumination environment on a modeling site can be acquired.

8 Claims, 9 Drawing Sheets

(56) References Cited

U.S. PATENT DOCUMENTS

| | | | |
|---|---|---|---|
| 7,221,809 B2 * | 5/2007 | Geng | G06K 9/00201 382/280 |
| 7,319,467 B2 * | 1/2008 | Weyrich | G06T 15/50 345/426 |
| 7,844,076 B2 * | 11/2010 | Corcoran | H04N 5/23219 382/103 |
| 8,009,880 B2 * | 8/2011 | Zhang | G06K 9/00268 382/118 |
| 8,090,160 B2 * | 1/2012 | Kakadiaris | G06K 9/00268 382/118 |
| 8,345,114 B2 * | 1/2013 | Ciuc | G06T 11/60 348/222.1 |
| 8,494,232 B2 * | 7/2013 | Bigioi | G06K 9/6255 382/118 |
| 8,902,305 B2 * | 12/2014 | Hwang | G06K 9/00993 348/77 |
| 8,922,553 B1 * | 12/2014 | Tena | G06T 13/00 345/423 |
| 9,117,105 B2 * | 8/2015 | Da | G06K 9/00221 |
| 9,508,197 B2 * | 11/2016 | Quinn | G06T 17/20 |
| 9,697,635 B2 * | 7/2017 | Quinn | G06K 9/00315 |
| 9,710,912 B2 * | 7/2017 | Kim | G06T 17/20 |
| 9,870,636 B2 * | 1/2018 | Tarquini | G06T 19/20 |
| 9,892,561 B2 * | 2/2018 | Choukroun | G06T 7/75 |
| 10,109,107 B2 * | 10/2018 | Knorr | G06T 7/11 |
| 10,346,677 B2 * | 7/2019 | Steinberg | G06K 9/00208 |
| 10,376,153 B2 * | 8/2019 | Tzvieli | G01J 5/12 |
| 10,417,824 B2 * | 9/2019 | Knorr | G06T 19/006 |
| 10,650,225 B2 * | 5/2020 | Nakano | G06K 9/00268 |
| 10,789,784 B2 * | 9/2020 | Lin | G06T 15/04 |
| 10,818,038 B2 * | 10/2020 | Beeler | G06T 7/97 |
| 2003/0137505 A1 * | 7/2003 | Ishikawa | G06T 17/20 345/419 |
| 2005/0089217 A1 * | 4/2005 | Nakagawa | G06T 17/10 382/162 |
| 2006/0227137 A1 * | 10/2006 | Weyrich | G06T 15/50 345/426 |
| 2013/0057656 A1 * | 3/2013 | Hwang | G06K 9/00275 348/47 |
| 2014/0192045 A1 * | 7/2014 | Hwang | G06T 15/02 345/419 |
| 2019/0029528 A1 * | 1/2019 | Tzvieli | A61B 5/015 |
| 2019/0362547 A1 * | 11/2019 | Lee | G06K 9/00214 |
| 2020/0058153 A1 * | 2/2020 | Ouyang | G06T 15/205 |

* cited by examiner

Wrapped phase of the left camera    Wrapped phase of the right camera

THREE-DIMENSIONAL REAL FACE MODELING METHOD AND THREE-DIMENSIONAL REAL FACE CAMERA SYSTEM

This application claims the benefit of Chinese Patent Application No. 2019101797748, filed Mar. 11, 2019, incorporated herein by reference in its entirety.

TECHNICAL FIELD

The present invention relates to the field of three-dimensional face modeling, and more particularly relates to a three-dimensional real face modeling method and a three-dimensional real face camera system.

BACKGROUND

Biometrics recognition technology has been developed rapidly in recent years. Many technologies such as fingerprint recognition, iris recognition, palmprint recognition and face recognition have been relatively matured. Particularly, the face recognition technology has attracted extensive attention due to its wide adaptability and non-contact characteristics. At present, most of the matured face recognition technologies are based on a two-dimensional face recognition technology, which is greatly limited by the influence of angle, illumination, age, expression, decorations and the like.

A three-dimensional face recognition technology can greatly reduce the limitation of environment, posture, expression and other factors on the face recognition rate due to the combination of three-dimensional face structure information and facial texture features. The premise of rapid development and application of the three-dimensional face recognition technology is the acquisition of three-dimensional face data. A pure three-dimensional portrait model only contains facial geometric shape data, and does not contain material-related skin property information reflecting a facial skin color, a reflectivity and the like, and such incomplete information in the application will limit its using in certain fields, which restrains the application of the three-dimensional face recognition technology in some fields. In order to give full play to the advantages of the three-dimensional face recognition technology and adapt to a variety of application scenes and technical solutions, the three-dimensional face data should have the following characteristics: 180-degree face range from a left ear to a right ear or front face range, high-precision three-dimensional point cloud and containing of facial skin property information. The facial skin property information is composed of skin surface chroma information and skin surface reflection characteristics. At the present, three-dimensional modeling products on the market are not aimed at three-dimensional face modeling applications, and have defects or shortcomings such as low precision, low shooting speed, small face region and failure of measuring the facial skin property information, which are difficult to be promoted and applied on a large scale. At present, it has not been reported that three-dimensional real face cameras have the characteristics of high speed, high precision, accurate facial skin property information and the like. In response to this demand, researchers have researched and developed a three-dimensional real face modeling method and a three-dimensional face camera system.

SUMMARY OF THE INVENTION

The present invention aims to synchronously acquire three-dimensional geometric information of a face and acquire skin surface chroma information and reflection characteristics which reflect facial skin property information, so as to build a three-dimensional real face model. The real three-dimensional face model describes inherent information of the face, reflects internal features of a target face and is unrelated to a modeling device for three-dimensional modeling and an illumination environment on a modeling site.

In order to achieve the abovementioned invention aim, a three-dimensional real face modeling method and a three-dimensional face camera system are provided. The following technical solution is provided:

a three-dimensional real face modeling method, including:

S1, projecting structured light to a target face, and acquiring images from different angles at the same time, wherein the images are sequential face images reflecting a facial three-dimensional geometric shape;

S2, acquiring facial skin chroma data and brightness data under a standard light source;

S3, calculating facial three-dimensional geometric data according to the sequential face images, and triangulating the facial three-dimensional geometric data into multiple triangular patch regions to acquire spatial structure information of the multiple triangular patch regions;

S4, calculating patch chroma data corresponding to each of the triangular patch regions;

S5, performing interpolation calculation by using pre-calibrated spatial light field energy distribution information under the illumination of the standard light source to acquire patch brightness data corresponding to each of the triangular patch regions; and S6, calculating a reflectivity of a facial skin region corresponding to each pixel point according to the spatial structure information and the patch brightness data of each of the triangular patch regions.

The facial three-dimensional geometric data are three-dimensional full face geometric data covering 180 degrees of the face from a left ear to a right ear. The step of calculating the facial three-dimensional geometric data includes:

calculating three-dimensional geometric data of the left face;
calculating three-dimensional geometric data of the right face;
fusing the three-dimensional geometric data of the left face and the three-dimensional geometric data of the right face to acquire the three-dimensional full face geometric data covering 180 degrees of the face from the left ear to the right ear.

The structured light is striped structured light, and the step of calculating the three-dimensional geometric data of the left face or the three-dimensional geometric data of the right face specifically includes:

extracting corresponding relative phase information from each of the sequential face images on the basis of a spatial phase unwrapping technology;
by taking face feature points as anchor points, unifying multiple pieces of relative phase information to the same reference for phase matching; and
acquiring a disparity map through the phase matching, and reconstructing the three-dimensional geometric data of the left face or the right face.

The structured light includes striped structured light and speckle structured light, and the step of acquiring the three-dimensional geometric data of the left face or the three-dimensional geometric data of the right face specifically includes:

extracting corresponding wrapped phase information from each of the sequential face images;

calculating wrapped phase order lines on the basis of the wrapped phase information, matching pixels on the wrapped phase order lines on speckle structured light images in the sequential face images, and acquiring matched line pairs of the wrapped phase order lines;
performing phase matching on a wrapped phase according to the matched line pairs to acquire a disparity map; and
reconstructing the three-dimensional geometric data of the left face or the right face according to the disparity map.

The step of calculating the patch chroma data corresponding to each of the triangular patch regions includes:
converting a coordinate system of the facial three-dimensional geometric data and a coordinate system of the facial skin chroma data to the same coordinate system; and
calculating the patch chroma data corresponding to each of the triangular patch regions according to spatial structure information of the multiple triangular patch regions and system calibration information.

The calibrated spatial light field energy distribution information under the illumination of the standard light source is indirectly represented by brightness information data of a white balance card, and a step of acquiring the brightness information data of the white balance card includes: under the illumination of the standard light source, placing the white balance card with a known reflectivity in a measuring space; and
acquiring position and posture information and brightness information of the white balance card, wherein the white balance card is located at multiple positions and has various postures at each position.

An interpolation calculation formula is as follows:

$$I_{base}(u,v) = \text{Interpolation}(u,v,v_1,v_2,v_3,\{I_1(u,v), I_2(u,v), \ldots, I_N(u,v)\}, \{P_1(u,v),P_2(u,v), \ldots, P_N(u,v)\})$$

wherein (u, v) is a certain pixel on an imaging colorimeter; $v_1$, $v_2$ and $v_3$ are three vertexes of a triangular patch where the pixel (u, v) is located; $I_i(u, v)$ represents the brightness information, corresponding to the pixel (u, v) of the imaging colorimeter of the white balance card with the known reflectivity under the illumination of the standard light source when the position posture of the white balance card is $P_i(u, v)$; N is the total number of the position postures of the shot white balance card in a calibrating process; and Interpolation represents the interpolation calculation.

A calculation formula of the reflectivity of a facial skin region corresponding to each of the pixel points is as follows:

$$R(u, v) = \frac{I_{face}(u, v)}{I_{base}(u, v)} R_{base}$$

wherein $I_{base}(u, v)$ is reference brightness information; $I_{face}(u, v)$ is actual brightness information of each of the pixel points; $R_{base}$ is an intrinsic reflectivity of the white balance card; and R(u, v) is the reflectivity of the facial skin surface region corresponding to each of the pixel points.

A three-dimensional real face camera system is provided, including a standard light source, a control and calculation module and a three-dimensional portrait acquisition unit.

The standard light source provides environmental illumination for the three-dimensional portrait acquisition unit for shooting skin intrinsic information.

The three-dimensional portrait acquisition unit acquires facial three-dimensional geometric data, facial skin chroma data and brightness data of a shot target.

The control and calculation module outputs a control signal to the three-dimensional portrait acquisition unit, receives the data of the three-dimensional portrait acquisition unit and completes three-dimensional real face modeling by using system calibration information.

The three-dimensional portrait acquisition unit includes an imaging colorimeter, a binocular camera and a projection assembly.

The projection assembly may project structured light to a target face and outputs a synchronous control signal to the binocular camera at the same time.

The binocular camera shoots the target face, to which the structured light is projected by the projection assembly, under the control of the synchronous control signal, and sends image data to the control module.

The imaging colorimeter shoots chroma information and brightness information of the target face under the illumination of the standard light source, and outputs the information to the control module.

Compared with the Prior Art, the Present Invention has the Following Beneficial Effects:

The three-dimensional portrait acquisition unit acquires the facial three-dimensional geometric data and the facial skin chroma data and brightness data, and performs fusion, calculation and the like to acquire the chroma information and reflectivity information of the target face, thereby acquiring a three-dimensional real face model which is high in measuring speed and high in data precision and is unrelated to a modeling device for three-dimensional modeling and an illumination environment on a modeling site.

DETAILED DESCRIPTION OF THE INVENTION

The present invention is further described below in detail in combination with embodiments and specific implementation modes, but this shall not be understood that the scope of the abovementioned subject of the present invention is only limited to the embodiments below. Any technologies implemented on the basis of the contents of the present invention shall all fall within the scope of the present invention.

The present invention describes implementation processes of a three-dimensional real face modeling method and a three-dimensional real face camera system by taking two three-dimensional portrait acquisition units, used for acquiring facial three-dimensional geometric data, facial skin chroma data and facial skin reflection characteristic data, for example.

Embodiment 1

Figure 1:
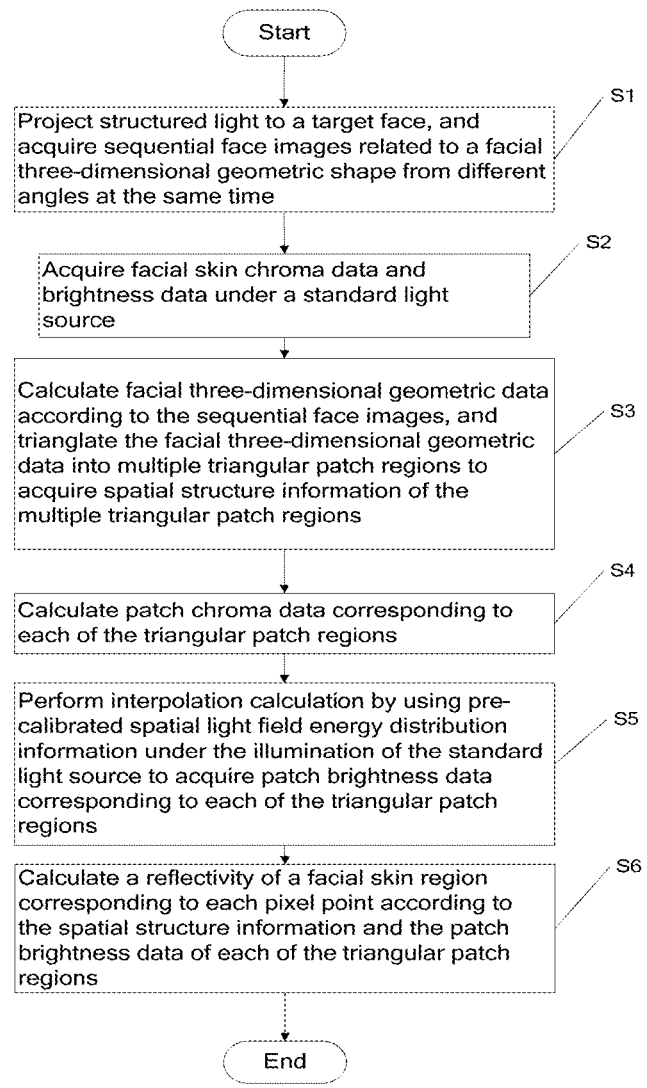
FIG. 1 is a flow chart of a three-dimensional real face modeling method according to the present invention.

A flow chart of a three-dimensional real face modeling method is as shown in FIG. 1, specifically including that:

Step S01: three-dimensional real face modeling data are acquired. A projection assembly projects a series of striped structured light (or striped structured light and speckle structured light) to a measured target face; a binocular camera acquires, in real time, corresponding sequential face images capable of related to a facial three-dimensional geometric shape; and then under the illumination of a standard light source, an imaging colorimeter acquires facial chroma information and brightness information which reflect skin inherent material information.

Step S02, three-dimensional geometric shape information of the left face and the right face is calculated according to a binocular stereo vision principle and a structured light technology.

The three-dimensional geometric shape information is calculated by adopting the following two modes.

Figure 2:
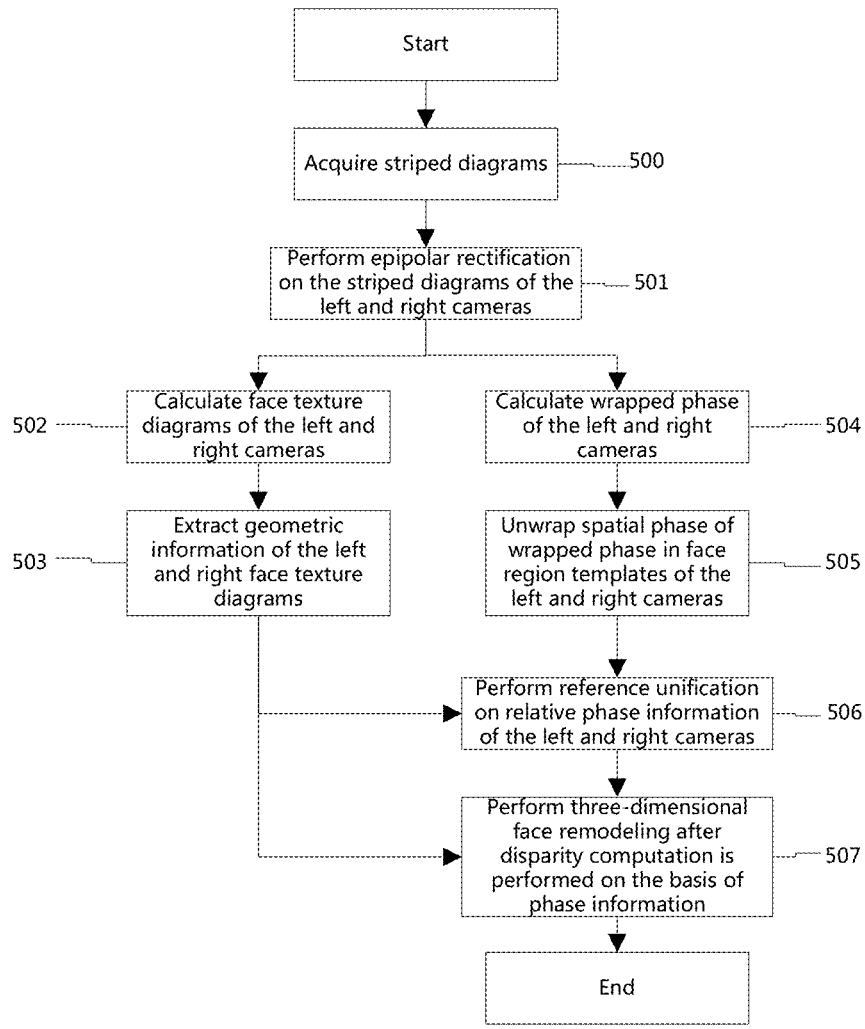
FIG. 2 is a flow chart of a three-dimensional geometric shape modeling method for performing reference unification on relative phase information acquired by a binocular camera by taking face feature points as anchor points in Embodiment 1 of the present invention.

1. phase reference uniformization is performed on relative phase information acquired by the binocular camera by taking face feature points as anchor points. A flow chart of a three-dimensional geometric shape modeling method is as shown in FIG. 2, including that:

Step S00, face images under the illumination of a striped structured light field are acquired, so as to acquire 8 striped diagrams, wherein each of left and right cameras acquires 4 diagrams (taking projection of 4 frames of striped structured light fields for example).

Step S01, the striped diagrams shot by the left and right cameras are subjected to epipolar rectification according to system calibration information.

Step S02, corresponding texture information is analyzed from the images in the striped structured light field, so as to generate texture image pairs.

Further, when stripes are projected to the surface of a three-dimensional object, shot deformed stripes are expressed by the formula below:

$$I_n(x, y) = R(x, y)\left[A(x, y) + B(x, y)\cos\left(\phi(x, y) + n\frac{2\pi}{N}\right)\right] \quad (1)$$

wherein (x, y) represents pixel coordinates; $R(x, y)$ is a distribution of the surface reflectivity of the face; $A(x, y)$ is a background light intensity; $B(x, y)/A(x, y)$ represents a contrast of the stripes; $\phi(x, y)$ is phase information contained in the striped structured light field; N is the number of striped diagrams selected for encoding $\phi(x, y)$, representing the number of phase shifts; and n is a serial number of a striped diagram, representing the nth phase shift and ranging between 1 and N.

For an N-step phase shift algorithm, a surface texture image of the face may be generated by corresponding N stripes. By taking the projection of 4 frames of striped structured light fields for example, the formula for calculating the texture image through the striped diagrams is as follows:

$$T(x,y)=[I_1(x,y)+I_2(x,y)+I_3(x,y)+I_4(x,y)]/2 \quad (2)$$

Figure 3:
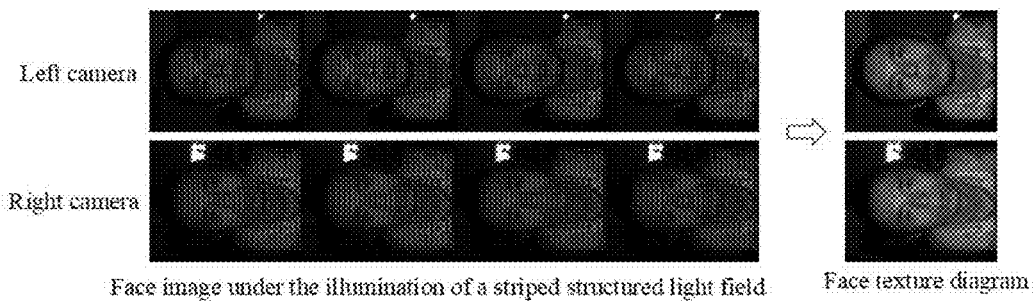
FIG. 3 is a texture diagram calculated according to a striped diagram in Embodiment 1 of the present invention.

On such a circumstance that N is not equal to 4, coefficients of the various frames of striped diagrams are correspondingly changed. When 4 frames of striped structured light fields are used for projection, the calculated texture diagram is as shown in FIG. 3.

Figure 4:
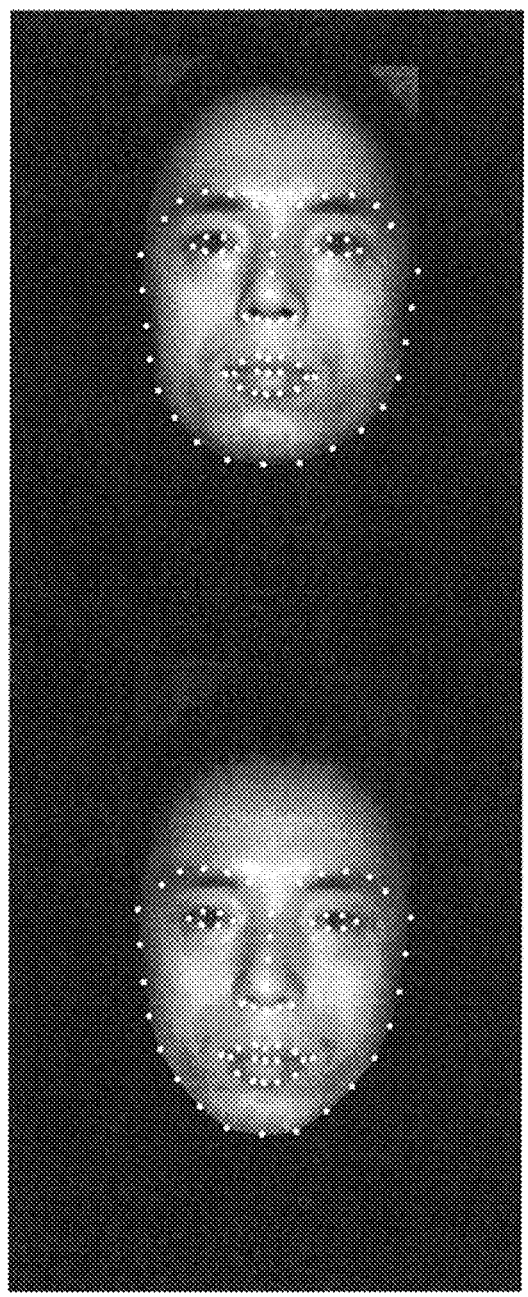
FIG. 4 shows a face region and feature point extraction result according to the texture diagram in Embodiment 1 of the present invention.

Step S03, a face region and face feature points of a face texture image corresponding to each camera are extracted on the basis of a two-dimensional image processing technology. One of extraction results is as shown in FIG. 4.

Further, the numbers of the extracted face feature points on the left and right texture images are equal, and distributions of the corresponding feature points on the face have the same topological structures and imply the same anatomical significance. Further, the face feature points may include a pupillary center, a nasal tip, a corner of the mouth and the like.

Figure 5:
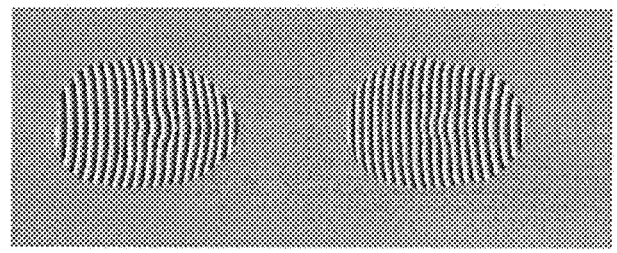
FIG. 5 is a wrapped phase diagram calculated according to the striped diagram in Embodiment 1 of the present invention.

Step S04, wrapped phase information is calculated by using the striped diagrams subjected to the epipolar rectification. For a method adopting N frames of striped structured light fields, a wrapped phase calculation formula is as follows:

$$\phi(x, y) = \arctan\frac{\sum_{n=1}^{N} I_n(x, y)\sin(2\pi n/N)}{\sum_{n=1}^{N} I_n(x, y)\cos(2\pi n/N)} \quad (3)$$

wherein $I_n$ represents the nth frame of striped diagram, and n ranges between 1 and N. Wrapped phase of the left and right cameras are as shown in FIG. 5.

Figure 6:
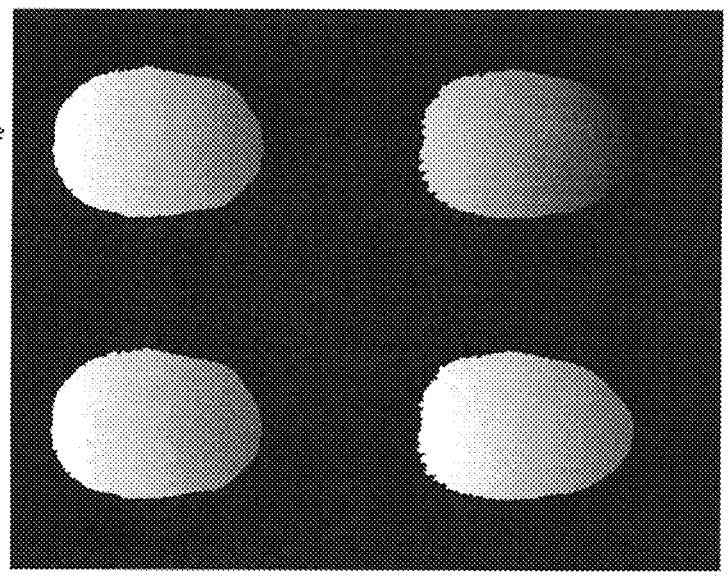
FIG. 6 shows a reliability orientation-based wrapped phase unwrapping result and a result acquired by unifying relative phase information of a right camera to the reference of relative phase information of a left camera by taking face feature points as anchor points in Embodiment 1 of the present invention.

Step S05, reliability-guided spatial phase unwrapping is performed by using the face region wrapped phase acquired in Step S04, as shown in FIG. 6.

Step S06, mutually independent relative phase information acquired by the binocular camera is unified by taking the acquired face feature points as the anchor points and referring to a spatial phase unwrapping result of the left camera, so as to make the relative phase information acquired by the right camera and the relative phase information acquired by the left camera to have the same reference.

Further, a relative phase value of the face feature points is compared with a relative phase value of the face feature points in the spatial phase unwrapping result of the right camera to calculate a difference value of the relative phase values of the face feature points of the left and right cameras, and the difference value is divided by $2\pi$ to obtain a solution which is then rounded off to obtain an integer k. After k is obtained, the phase diagram of the right camera is added with $2k\pi$, thereby realizing the unification of the mutually independent relative phase information acquired by the binocular camera by taking the face feature points as the anchor points. The unified relative phase information of the left and right cameras is as shown in FIG. 6. In the embodiment in the figure, k is −6. The value of k is related to a position of a phase unwrapping starting point in algorithm implementation.

Figure 7:
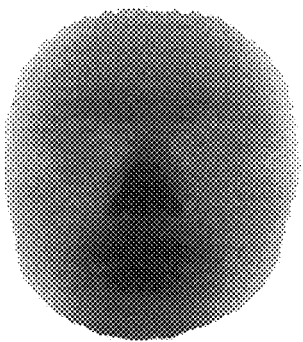
FIG. 7 is a disparity map obtained by phase matching of reference-unified relative phase information in Embodiment 1 of the present invention.

Step S07, phase matching is performed on the relative phase information, subjected to the reference unification, of the left and right cameras to acquire a disparity map as shown in FIG. 7, and a three-dimensional model of a face to be measured is calculated according to the disparity map and the system calibration information.

Figure 8:
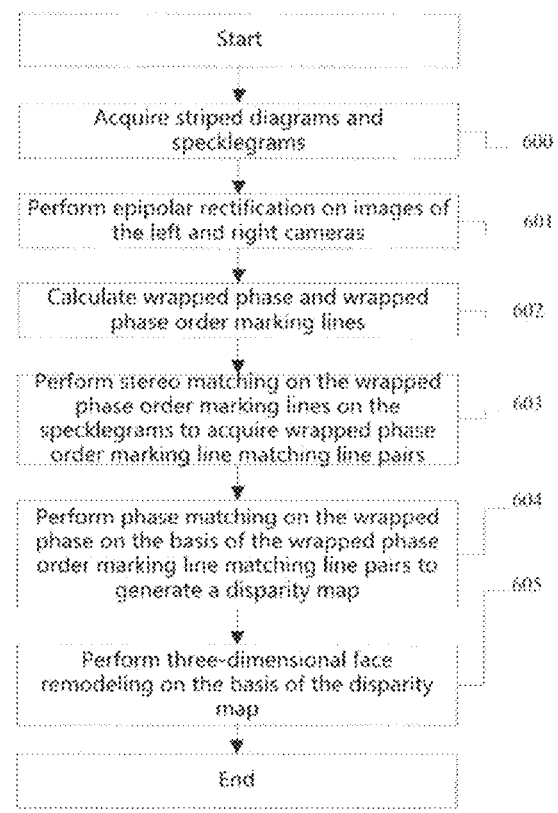
FIG. 8 is a flow chart of a three-dimensional geometric shape modeling method for matching wrapped phase order marking lines by using speckle images and then performing phase matching on a wrapped phase on the basis of the marking line pairs in Embodiment 1 of the present invention.

2. A flow chart of a three-dimensional geometric shape modeling method is as shown in FIG. 8, including that:

Step 600, face images under the illumination of a structured light field are acquired, so as to acquire 10 striped diagrams, wherein each of left and right cameras acquires 5 diagrams (taking 4 frames of striped structured light fields and 1 frame of speckle structured light field for example).

Step 601, striped diagrams and specklegrams which are shot by the left and right cameras are subjected to epipolar rectification according to system calibration information.

Figure 9:
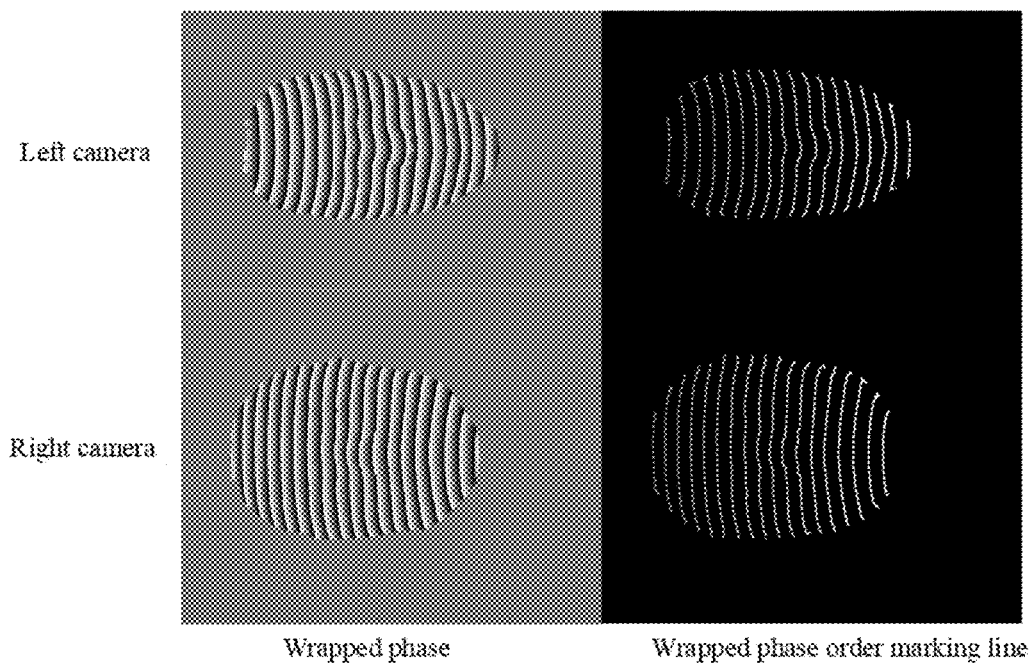
FIG. 9 is a diagram showing wrapped phase and wrapped phase order marking lines which are calculated according to the striped diagram in Embodiment 1 of the present invention.

Step 602, wrapped phase are calculated by using the striped diagrams subjected to the epipolar rectification, and then are processed to acquire wrapped phase order marking lines. The wrapped phase calculated according to the striped diagrams and the wrapped phase order marking lines are as shown in FIG. 9.

Further, wrapped phase information is calculated by using the striped diagrams subjected to the epipolar rectification. For a method adopting N frames of striped structured light fields, a wrapped phase calculation formula is as shown in formula (3).

Further, the wrapped phase order marking lines are acquired by analyzing the wrapped phase, and are defined as jump edges of the wrapped phase from −π to π. According to the face images shot under the illumination of the N frames of striped structured light fields, N wrapped phase can be acquired by adjusting the wrapped phase calculation process. The difference between these N wrapped phase is reflected by the difference in phase values and the difference in jump positions of the wrapped phase from −π to π. Theoretically, the difference in the phase values is $2k\pi + 2\pi/N$.

Further, the positions of the selected wrapped phase order marking lines may be the same as or different from the jump edge positions of the wrapped phase from −π to π.

Further, the phase order marking lines also may be defined as jump edges of the wrapped phase from π to −π.

Step 603, stereo matching is performed on the wrapped phase order marking lines on the speckle images to acquire wrapped phase order marking line matching line pairs.

Further, in the matching process of the wrapped phase order marking line pairs, each of the wrapped phase order marking lines is matched. In the matching process of a certain wrapped phase order line, the matching may be performed in a pixel-by-pixel manner or at an interval of several pixels. For each pixel on the wrapped phase order marking line in the left view, candidate matching pixel points are located on the wrapped phase order marking line in the right view.

Figure 10:
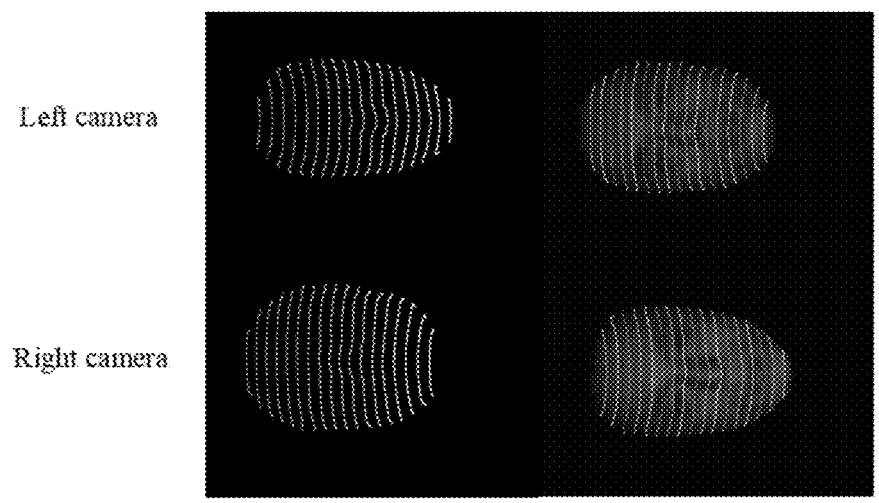
FIG. 10 is a diagram showing wrapped phase order marking line pairs acquired by cross-correlation matching based on speckle images in Embodiment 1 of the present invention.

Further, cross correlation is used as an evaluation standard for the similarity of candidate point pairs in the matching process. Candidate matching pixel points with the maximum cross correlation values are matching points, and reference labels, corresponding to the matching points, of the wrapped phase order marking line of the right camera are recorded. The reference sign acquired by all the pixels of each of the wrapped phase order marking lines of the left camera is voted, and a certain wrapped phase order marking line, corresponding to the reference sign with the highest vote, of the right camera and this wrapped phase order marking line of the left camera form the wrapped phase order marking line pair. All the wrapped phase order marking lines of the left camera are processed as above. The wrapped phase order marking line pairs acquired by Step 603 are as shown in FIG. 10. In the figure, the gray scales, in the left and right cameras, of the same wrapped phase order marking line are the same (for clear displaying, the gray scale value of the marking line is repeated once every 3 pieces).

Step 604, on the basis of the wrapped phase marking line pairs, the phase matching in the same order is performed by using the wrapped phase information, so as to acquire a subpixel high-precision dense disparity map of the face.

Step 605, a three-dimensional model of a face to be measured is calculated according to the disparity map and the system calibration information.

Step S03: three-dimensional facial geometric shape information of the left face and three-dimensional facial geometric shape information of the right face in Step S02 are fused to acquire triangulated three-dimensional full face geometric data covering 180 degrees from a left ear to a right ear. Specific implementation steps are as follows:

ICP (Internet Content Provider)-based point cloud registration, Poisson reconstruction-based face curve surface reconstruction and triangulation of facial three-dimensional data.

Step S04: the three-dimensional full face geometric data acquired in Step S03 and a coordinate system (which can be understood as a camera) where the imaging colorimeter is located are unified to the same coordinate system, and a triangular region of each triangular patch on the imaging colorimeter data in the full face geometric shape information is calculated by using a camera imaging principle, so as to acquire chroma information and brightness information which correspond to each triangular patch. Influenced by the number of the triangular patches describing the three-dimensional full face geometric shape, the normal direction and the resolution of the imaging colorimeter, the number of pixels in the triangular region, corresponding to each triangular patch, on the imaging colorimeter data will be different. A fusion result of the chroma information and the brightness information comes from the data acquired by two units if a certain triangular patch is located in a common region of the three-dimensional data of the left and right faces.

Step S05: for each of the triangular patches of the three-dimensional full face geometric data, reflectivity information of the facial skin surface region corresponding to the triangular patch is calculated according to pre-calibrated spatial light field energy distribution information under the illumination of the standard light source, spatial structure information represented by the triangular patch and the fused brightness information of the triangular patch.

The triangular patch $f_{tri}$ is the most basic element of three-dimensional real face information, and can be described as $f_{tri}(v_1, v_2, v_3, r, a, b)$, and $v_1$, $v_2$ and $v_3$ are three vortexes of the triangular patch. The sequence of the three vortexes decides a normal direction of the triangular patch; r is the reflectivity information of the triangular patch; (a, b) is the chroma information corresponding to the triangular patch; and the chroma information is a fusion result of the chroma information in Step S05.

By placing the white balance card (such as a white balance gray card with the reflectivity of 18 percent) with the known reflectivity in a measuring space under the illumination of the standard light source, the pre-calibrated spatial light field energy distribution information under the illumination of the standard light source is indirectly represented by using the brightness information data, shot by the imaging colorimeter at multiple positions and in multiple postures, of the white balance card.

In a calibrating process, under each of the position postures, striped structured light and speckle structured light are projected to the white balance card, and images are acquired from different angles at the same time; and then spatial geometric shape (position and normal direction) information of the white balance card is calculated. For each pixel (u, v) of the imaging colorimeter, the position posture $P_i$(u, v) of a local region of the multi-position-posture white balance card corresponding to the pixel is calculated. For each of pixel points, the position posture $P_i$(u, v) of the multi-position-posture white balance card corresponding to each pixel (u, v) of the imaging colorimeter and the $I_i$(u, v) sequence (i is the total number of the position postures of the white balance card) of the brightness information are used as the observed spatial light energy distribution information of the pixel point.

After the calibration is completed, the brightness information, shot by the imaging colorimeter at a certain position and in a certain posture, of the white balance card of a certain pixel may be acquired by interpolation calculation implemented by using the data acquired in the calibrating process without actual acquisition. An interpolation result is related to spatial information of the triangular patch in which the pixel to be interpolated is located, and is related to the position, posture, number and brightness information, which are shot in the calibrating process, of the white balance card. That is:

$I(u,v)$=Interpolation$(u,v,v_1,v_2,v_3,\{I_1(u,v),$
$I_2(u,v), \ldots J_N(u,v)\}, \{P_1(u,v),P_2(u,v), \ldots ,$
$P_N(u,v)\})$ wherein (u, v) is a certain pixel on the imaging colorimeter; $v_1$, $v_2$ and $v_3$ are three vertexes of a triangular patch where the pixel (u, v) is located; $I_i$(u, v) represents the brightness information, corresponding to the pixel (u, v) of the imaging colorimeter, of the white balance card with the known reflectivity under the illumination of the standard light source when the position posture of the white balance card is $P_i$(u, v); N is the total number of the position postures of the shot white balance card in the calibrating process; and Interpolation represents the interpolation calculation.

For each of the triangular patches of the three-dimensional full face geometric data, the spatial structure information represented thereby is known, and the face region chroma information and brightness information which correspond to the triangular patch are known, so that the brightness information of all the pixel points corresponding to the triangular patch can be acquired by the interpolation calculation in the pre-calibrated spatial light field energy distribution information under the illumination of the standard light source in case of a hypothesis that the facial skin and the white balance card are of the same material. The brightness information acquired by using this mode is defined as reference brightness information $I_{base}$(u, v). The actual brightness information $I_{fase}$(u, v) of each of the pixel points is compared with the reference brightness information acquired in the hypothesis that the facial skin and the white balance card are of the same material, and the intrinsic reflectivity information $R_{base}$ of the white balance card is used, thereby acquiring the reflectivity R(u, v) of the skin surface corresponding to each of the pixel point, namely:

$$R(u, v) = \frac{I_{face}(u, v)}{I_{base}(u, v)} R_{base}$$

Figure 11:
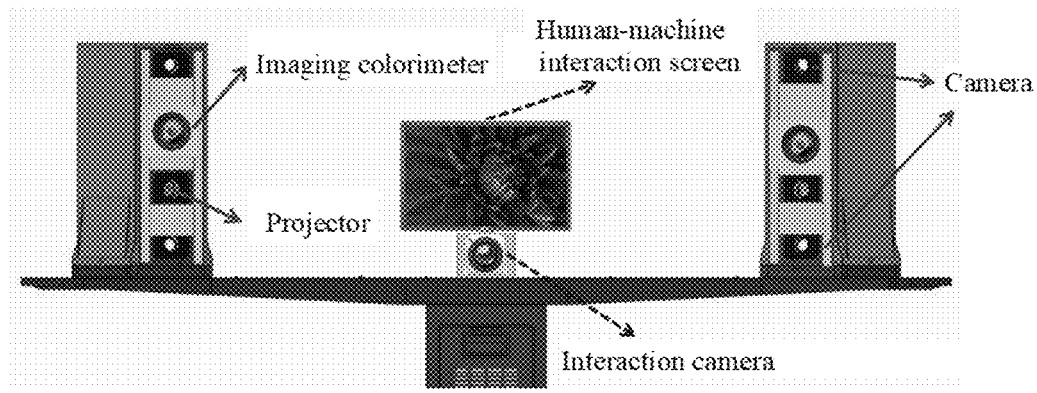
FIG. 11 is a structural schematic diagram of a three-dimensional real face camera system according to Embodiment 1 of the present invention.
Figure 12:
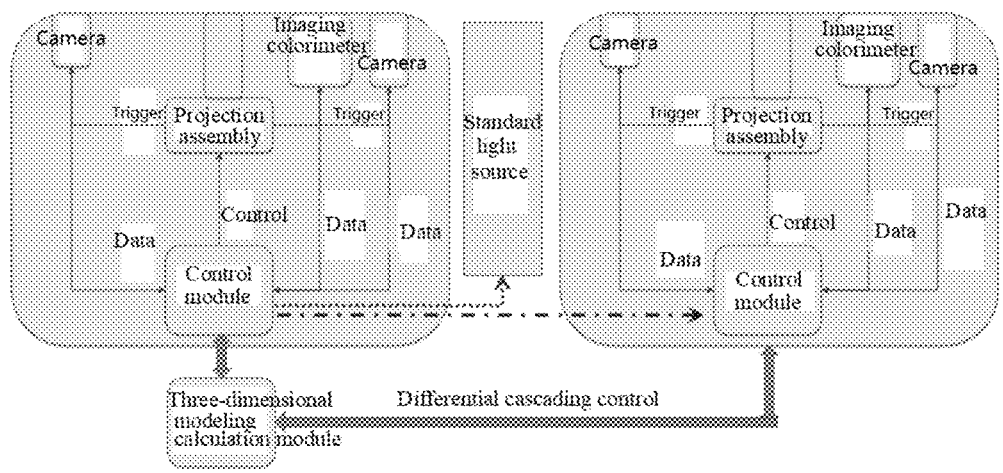
FIG. 12 is a schematic diagram of a logic relation of components of the three-dimensional real face camera system according to Embodiment 1 of the present invention.

In the present embodiment, a three-dimensional real face camera system is mainly composed of one standard light source and two three-dimensional portrait acquisition units. As shown in FIG. 11, each of the units respectively acquires three-dimensional geometric structure information and skin property information of the left and right faces of a shot target and then fuses the information data to form a three-dimensional real face model covering 180 degrees from a left ear to a right ear. The standard light source provides environmental illumination when the three-dimensional portrait acquisition units shoot skin inherent information. Each of the three-dimensional portrait acquisition units includes a projection assembly, industrial cameras, an imaging colorimeter and a control module. The projection assembly projects N (N≥3) frames of structured light fields with an adjustable quantity to the face surface and outputs a synchronous control signal to the camera at the same time. The work of the imaging colorimeter is controlled by the control module. The camera works in an external triggered state, shoots the face surface illuminated by the structured light field as modeling images under the control of the synchronous control signal, and transmits the modeling images to a three-dimensional modeling calculation module through the control module. The imaging colorimeter shoots facial color and brightness information under the illumination of the standard light source and transmits the information to the three-dimensional modeling calculation module through the control module. The control module coordinately controls a working time sequence of the projection assembly, the industrial camera, the imaging colorimeter and the standard light source. The three-dimensional modeling calculation module receives the data acquired by the camera and the imaging colorimeter and realizes three-dimensional real face modeling by using system calibration information. A logic relation of the components of the three-dimensional real face camera system is as shown in FIG. 12.

In order to shorten the data acquisition time, the control modules are used for coordinating the working time sequences of the projection assemblies, the cameras and the imaging colorimeters in the units to coordinate the working time sequence of the two units. The projection assemblies and the industrial cameras are the same in working frequency not less than 120 fps to shorten the shooting time, thereby reducing the influence of body movement on the precision during shooting. In order to accelerate data acquisition, the two three-dimensional portrait acquisition units are connected in series with each other through a differential cascading signal to form a master control unit and a slave control unit. In a data acquisition process, a three-dimensional modeling data acquisition triggering signal is sent to the master control unit at first; the master control unit receives the triggering signal and then controls the projection assembly in the master control unit to project structured light and synchronously triggers the camera to take photos; and after completing projection, the master control unit sends an inter-unit triggering signal to the slave control unit; the slave control unit starts to project structured light and synchronously triggers the camera to take photos when receiving the inter-unit triggering signal; and after the slave unit completes the projection and a computer receives all the image data, three-dimensional full face modeling calculation is performed. The imaging colorimeters in the master and slave units are enabled to shoot the color information of the target at the same time to acquire chroma information and brightness information. Skin surface reflectivity information is acquired according to a relation between the brightness and the reflectivity under a certain calibrated geometric shape.

Figure 13:
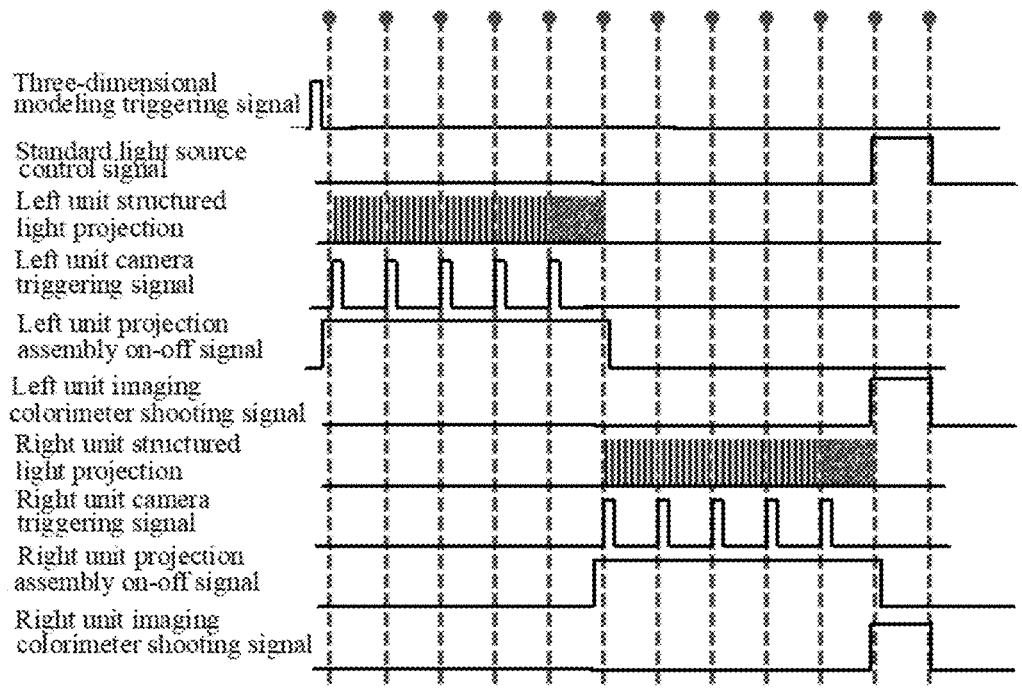
FIG. 13 is an acquisition time sequence of data acquisition of the three-dimensional real face camera system according to Embodiment 1 of the present invention.

When the differential cascading signal is used to connect and form the master control unit and the slave control unit, a sequential logic of the system is as shown in FIG. 13. It is assumed that each portrait acquisition unit needs to project and shoot 5 frames of structured light images to perform face modeling. A projection assembly structured light field projection signal and a camera triggering control signal are uniformly given by the control module, and are maintained strictly synchronized, that is, the camera receives the triggering signals every time when the projection assembly projects a structured light field, so that the exposure time of the camera is contained in each structured light field projected by the projection assembly to achieve the best three-dimensional face modeling effect. As the selected projection assemblies and cameras have different performance parameters, the shooting speeds of this synchronization mode are also different, such as projection assemblies for 120 fps, 8-bit gray scale image projection and cameras with an external triggering frame rate supporting 120 fps. On the shortest time circumstance, the acquisition of three-dimensional face modeling images takes only 11 frames, which is 11/120 seconds. If a binarized projection assembly with a projection assembly frame rate of several thousand frames is used to cooperate with a camera with a corresponding frame rate, the shooting time will be greatly shortened.

Embodiment 2

Figure 14:
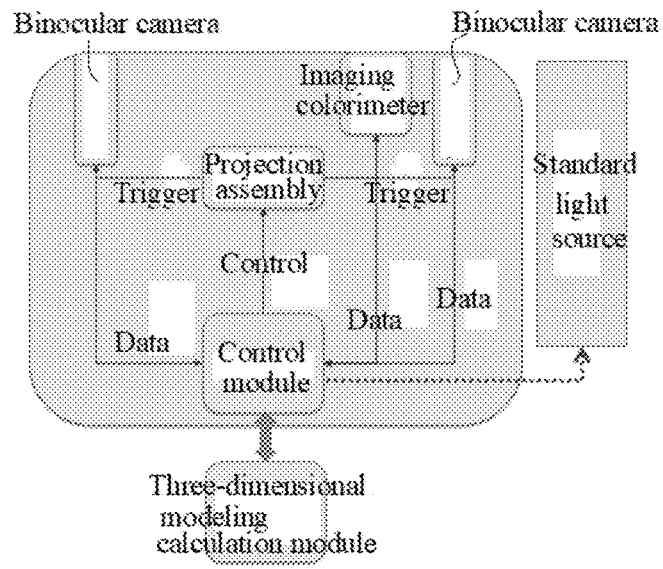
FIG. 14 is a schematic diagram of a logic relation of components of a three-dimensional real face camera system according to Embodiment 2 of the present invention.

The difference between Embodiment 2 and Embodiment 1 is that a three-dimensional real face camera system is mainly composed of 1 standard light source and 1 three-dimensional portrait acquisition unit. The three-dimensional portrait acquisition unit includes a projection assembly, a binocular camera, an imaging colorimeter and a control module, as shown in FIG. 14. The three-dimensional portrait acquisition unit is used for acquiring three-dimensional geometric structure information and skin property information of the front face of a shot target. A three-dimensional modeling calculation module realizes three-dimensional real face modeling of the front face according to the three-dimensional geometric structure information and skin property information of the front face.

Compared with Embodiment 1, the three-dimensional modeling method is different that only the three-dimensional geometric structure information and the skin property information of the front face are acquired, so that no fusion of the facial three-dimensional geometric shape information is performed any more in Steps S02, S03 and S04. Specific processes are as follows:

Step S02: the three-dimensional geometric shape information of the front face is calculated according to a binocular stereoscopic vision principle and a structured light technology.

The three-dimensional geometric shape information is calculated by adopting one of the following two modes:

1. face region extraction, epipolar rectification, wrapped phase calculation, wrapped phase order line calculation, correlation-based speckle image matching, wrapped phase spatial phase unwrapping, binocular camera phase unwrapping reference unification, phase-based stereo matching, and calculation of the geometric shape information of the face by using a disparity map and system parameters; and 2. face region and feature extraction, epipolar rectification, wrapped phase calculation, phase based stereo matching, and calculation of the geometric shape information of the face by using a disparity map and system parameters.

Step S03: the facial geometric shape information of the front face in Step S02 is triangulated. Specific implementation steps are as follows:

ICP (Internet Content Provider)-based point cloud registration, Poisson reconstruction-based face curve planar reconstruction and triangulation of facial three-dimensional data.

Step S04: the three-dimensional full face geometric data acquired in Step S03 and a coordinate system (which can be understood as a camera) where the imaging colorimeter is located are unified to the same coordinate system, and a triangular region of each triangular patch on the imaging colorimeter data in the front face geometric shape information is calculated by using a camera imaging principle, so as to acquire chroma information and brightness information which correspond to each triangular patch. Influenced by the number of the triangular patches describing the three-dimensional front face geometric shape, the normal direction and the resolution of the imaging colorimeter, the number of pixels in the triangular region, corresponding to each triangular patch, on the imaging colorimeter data will be different.

Other steps are the same as those in Embodiment 1, so no more details will be described.

Embodiment 3

Figure 15:
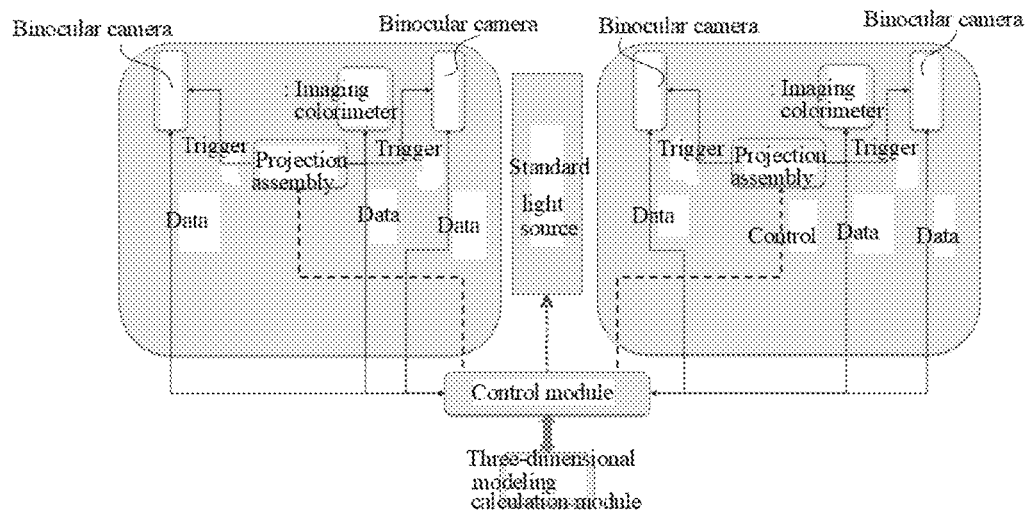
FIG. 15 is a schematic diagram of a logic relation of components of a first three-dimensional real face camera system according to Embodiment 3 of the present invention.

The difference between Embodiment 3 and Embodiment 1 is that the two three-dimensional portrait acquisition units do not include the control modules, and one control module is adopted for centralized control, as shown in FIG. 15. The control module outputs a control signal to the three-dimensional portrait acquisition units and receives data of the three-dimensional portrait acquisition units. A three-dimensional modeling calculation module realizes three-dimensional real face modeling of the front face according to the three-dimensional geometric structure information and skin property information of the front face.

Figure 16:
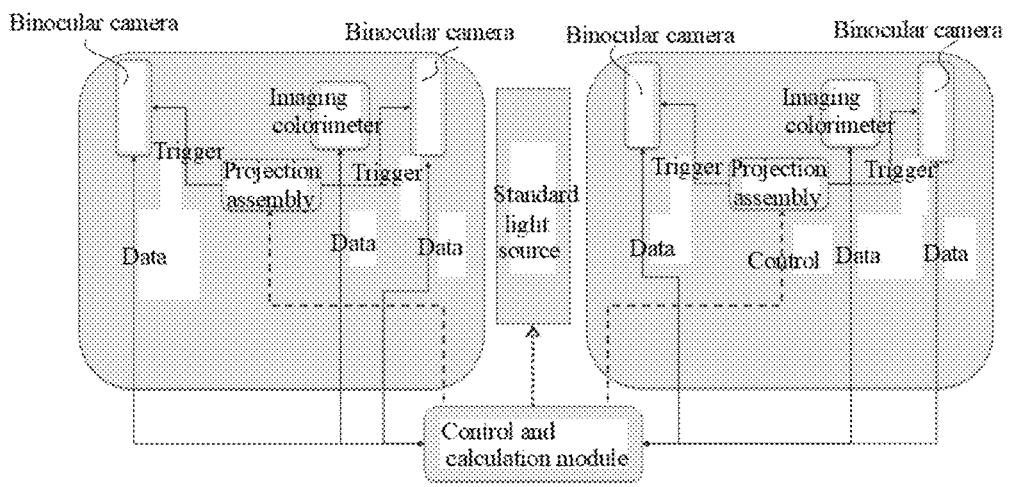
FIG. 16 is a schematic diagram of a logic relation of components of a second three-dimensional real face camera system according to Embodiment 3 of the present invention.

On the basis of FIG. 15, the control module and the three-dimensional modeling calculation module can be combined into a control and calculation module to form a three-dimensional real face camera system, as shown in FIG. 16.

Other parts are the same as those in Embodiment 2, so no more details will be described.

All three-dimensional real face camera systems which extend multiple three-dimensional portrait acquisition units on the basis of the basic framework of the present embodiment shall fall within the protection scope of the present invention.

The invention claimed is:

1. A three-dimensional real face modeling method, comprising:
   projecting structured light to a target face, and acquiring images from different angles at a same time, wherein the images are sequential face images reflecting a facial three-dimensional geometric shape;
   acquiring facial skin chroma data and brightness data under a standard light source;
   calculating facial three-dimensional geometric data according to the sequential face images, and triangulating the facial three-dimensional geometric data into multiple triangular patch regions to acquire spatial structure information of the multiple triangular patch regions;
   calculating patch chroma data corresponding to each of the triangular patch regions;
   performing an interpolation calculation using pre-calibrated spatial light field energy distribution information under illumination from the standard light source to acquire patch brightness data corresponding to each of the triangular patch regions; and
   calculating a reflectivity of a facial skin region corresponding to each pixel point according to the spatial structure information and the patch brightness data of each of the triangular patch regions.

2. The three-dimensional real face modeling method according to claim 1, characterized in that the facial three-dimensional geometric data are three-dimensional full face geometric data covering 180 degrees of the face from a left ear to a right ear; and
   calculating the facial three-dimensional geometric data comprises:
   calculating three-dimensional geometric data of a left face;
   calculating three-dimensional geometric data of a right face; and
   fusing the three-dimensional geometric data of the left face and the three-dimensional geometric data of the right face to acquire the three-dimensional full face geometric data covering 180 degrees of the face from the left ear to the right ear.

3. The three-dimensional real face modeling method according to claim 2, characterized in that the structured light is striped structured light, and calculating the three-dimensional geometric data of the left face or the three-dimensional geometric data of the right face comprises:
   extracting corresponding relative phase information from each of the sequential face images on the basis of a spatial phase unwrapping technology;
   by taking face feature points as anchor points, unifying multiple pieces of relative phase information to a same reference for phase matching; and
   acquiring a disparity map through the phase matching, and rebuilding the three-dimensional geometric data of the left face or the right face.

4. The three-dimensional real face modeling method according to claim 2, characterized in that the structured light comprises striped structured light and speckle structured light, and acquiring the three-dimensional geometric data of the left face or the three-dimensional geometric data of the right face comprises:
   extracting corresponding wrapped phase information from each of the sequential face images;
   calculating wrapped phase order lines from the wrapped phase information, matching pixels on the wrapped phase order lines on speckle structured light images in the sequential face images, and acquiring matched line pairs of the wrapped phase order lines;
   performing phase matching on a wrapped phase according to the matched line pairs to acquire a disparity map; and
   reconstructing the three-dimensional geometric data of the left face or the right face according to the disparity map.

5. The three-dimensional real face modeling method according to claim 1, characterized in that calculating the patch chroma data corresponding to each of the triangular patch regions comprises:
   converting a coordinate system of the facial three-dimensional geometric data and a coordinate system of the facial skin chroma data to a same coordinate system; and
   calculating the patch chroma data corresponding to each of the triangular patch regions according to the spatial structure information of the multiple triangular patch regions and system calibration information.

6. The three-dimensional real face modeling method according to claim 1, characterized in that the calibrated spatial light field energy distribution information under the illumination from the standard light source is indirectly represented by brightness information data of a white balance card, and the brightness information data of the white balance card is acquired by a process that comprises:
   under the illumination from the standard light source, placing the white balance card with a known reflectivity in a measuring space; and
   acquiring position and posture information and brightness information of the white balance card, wherein the white balance card is located at multiple positions and has various postures at each position.

7. The three-dimensional real face modeling method according to claim 1, characterized in that the interpolation calculation is performed using a formula:

$$I_{base}(u,v) = \text{Interpolation}(u,v,v_1,v_2,v_3,\{I_1(u,v), I_2(u,v), \ldots, I_N(u,v)\}, \{P_1(u,v), P_2(u,v), \ldots, P_N(u,v)\})$$

wherein (u, v) is a certain pixel on an imaging colorimeter; $v_1$, $v_2$ and $V_3$ are three vertexes of a triangular patch where the pixel (u, v) is located; $I_i(u, v)$ represents brightness information corresponding to the pixel (u, v) on the imaging colorimeter of the white balance card with the known reflectivity under the illumination of the standard light source when a position and posture of the white balance card is $P_i(u, v)$; N is the total number of positions and postures of the white balance card shot in a calibrating process; and Interpolation represents the interpolation calculation.

8. The three-dimensional real face modeling method according to claim 1, characterized in that the reflectivity of the facial skin region corresponding to each pixel point is calculated as follows:

$$R(u, v) = \frac{I_{face}(u, v)}{I_{base}(u, v)} R_{base}$$

wherein $I_{base}(u, v)$ is reference brightness information; $I_{face}(u, v)$ is actual brightness information of each pixel point; $R_{base}$ is an intrinsic reflectivity of the white balance card; and $R(u, v)$ is the reflectivity of the facial skin surface region corresponding to each pixel point.

* * * * *